United States Patent
Elagin et al.

(10) Patent No.: US 9,718,704 B2
(45) Date of Patent: Aug. 1, 2017

(54) POLYSACCHARIDE MICROGELS FOR CLEANING WATER OF PETROLEUM AND PETROLEUM PRODUCTS AND METHOD FOR USING SAME (VARIANTS)

(71) Applicant: OBSCHESTVO SOGRANICHENNOJ OTVETSVENNOSTYU "NPOBIOMIKROGELI", Ekaterinburg (RU)

(72) Inventors: Andrey Aleksandrovich Elagin, Ekaterinburg (RU); Maksim Anatolevich Mironov, Ekaterinburg (RU); Vladislav Sergeevich Ponomarev, Ekaterinburg (RU)

(73) Assignee: Obshchestvo S Ogranichennoj Otvetstvennostyu "NPO Biomikrogeli", Ekaterinburg (RU)

( * ) Notice: Subject to any disclaimer, the term of this patent is extended or adjusted under 35 U.S.C. 154(b) by 344 days.

(21) Appl. No.: 14/408,656

(22) PCT Filed: Jun. 18, 2013

(86) PCT No.: PCT/RU2013/000506
§ 371 (c)(1),
(2) Date: Dec. 17, 2014

(87) PCT Pub. No.: WO2013/191590
PCT Pub. Date: Dec. 27, 2013

(65) Prior Publication Data
US 2015/0191368 A1  Jul. 9, 2015

(30) Foreign Application Priority Data

Jun. 19, 2012 (RU) ............................ 2012125534
Aug. 27, 2012 (RU) ............................ 2012136757
May 22, 2013 (RU) ............................ 2013123536

(51) Int. Cl.
| | | |
|---|---|---|
| B01D 24/00 | (2006.01) | |
| B01D 37/00 | (2006.01) | |
| C02F 1/00 | (2006.01) | |
| E02B 15/00 | (2006.01) | |
| B01D 21/01 | (2006.01) | |
| C02F 1/52 | (2006.01) | |
| C02F 1/28 | (2006.01) | |
| B01J 20/24 | (2006.01) | |
| C02F 1/56 | (2006.01) | |

(Continued)

(52) U.S. Cl.
CPC .......... *C02F 1/286* (2013.01); *B01D 17/0202* (2013.01); *B01D 17/047* (2013.01); *B01J 20/24* (2013.01); *B01J 20/28004* (2013.01); *B01J 20/28047* (2013.01); *C02F 1/001* (2013.01); *C02F 1/285* (2013.01); *C02F 1/5272* (2013.01); *C02F 1/56* (2013.01); *C02F 1/681* (2013.01); *E02B 15/041* (2013.01); *C02F 1/385* (2013.01); *C02F 1/66* (2013.01); *C02F 2101/20* (2013.01); *C02F 2101/32* (2013.01); *C02F 2103/007* (2013.01); *C02F 2103/10* (2013.01); *C02F 2103/365* (2013.01); *C02F 2303/16* (2013.01); *C02F 2305/08* (2013.01)

(58) Field of Classification Search
CPC .. C02F 1/56; C02F 1/681; C02F 1/286; C02F 1/385; C02F 2101/32
See application file for complete search history.

(56) References Cited

U.S. PATENT DOCUMENTS

| | | | |
|---|---|---|---|
| 4,178,265 A | 12/1979 | Matsuda et al. | |
| 2004/0258753 A1* | 12/2004 | Demeester | ........... A61K 9/0019 424/473 |
| 2012/0035085 A1* | 2/2012 | Parnell | .................... C09K 8/604 507/213 |
| 2012/0145645 A1* | 6/2012 | Wietholter | ............ C02F 1/5236 210/723 |
| 2013/0302405 A1* | 11/2013 | Takaha | .................... C12P 19/26 424/450 |

FOREIGN PATENT DOCUMENTS

| | | |
|---|---|---|
| RU | 2148425 | 5/2000 |
| RU | 2240865 | 11/2004 |

(Continued)

OTHER PUBLICATIONS

English Abstract of RU 73618.

*Primary Examiner* — Ana Fortuna
(74) *Attorney, Agent, or Firm* — Preston Smirman; Smirman IP Law, PLLC

(57) ABSTRACT

The group of inventions relates to the field of organic chemistry and can be used for cleaning water, industrial and domestic waste water or waste water sediment, and for the containment and recovery of petroleum and petroleum product spills in large bodies of water, rivers, lakes and seas. In the claimed group of inventions, aqueous solutions of polysaccharide microgels, having a molecular mass of 20000-200000 daltons and a particle size of 50-600 nm, are used as a substance for cleaning water of petroleum and petroleum products. Moreover, low concentrations of polysaccharide microgels in water, ranging from 0.1 to 20 g/l, are used. Said solutions are used as a surface modifier for a filter used in separating water-oil emulsions, as a sorbent for the containment and recovery of oil spills in an aqueous medium, and also as a coagulant for the cleaning of water polluted by petroleum and petroleum products. The technical result is in making it possible to recover a commercial product, recovered during the process of cleaning water of petroleum or petroleum products, and to recover the starting substance for the reuse thereof, while simultaneously simplifying the slurry utilization process.

14 Claims, No Drawings

(51) Int. Cl.
  *E02B 15/04*    (2006.01)
  *B01D 17/02*    (2006.01)
  *B01D 17/04*    (2006.01)
  *C02F 1/68*     (2006.01)
  *B01J 20/28*    (2006.01)
  *C02F 1/38*     (2006.01)
  *C02F 1/66*     (2006.01)
  *C02F 101/20*   (2006.01)
  *C02F 101/32*   (2006.01)
  *C02F 103/00*   (2006.01)
  *C02F 103/10*   (2006.01)
  *C02F 103/36*   (2006.01)

(56) References Cited

FOREIGN PATENT DOCUMENTS

| | | |
|---|---|---|
| RU | 2276161 | 5/2006 |
| RU | 2279405 | 7/2006 |
| RU | 73618 | 5/2008 |
| RU | 2352388 | 4/2009 |
| RU | 2439244 | 1/2012 |
| RU | 2471041 | 9/2012 |
| RU | 2479348 | 4/2013 |

\* cited by examiner

POLYSACCHARIDE MICROGELS FOR CLEANING WATER OF PETROLEUM AND PETROLEUM PRODUCTS AND METHOD FOR USING SAME (VARIANTS)

CROSS-REFERENCE TO RELATED APPLICATION

The instant application is a national phase of PCT International Application No. PCT/RU2013/000506, filed Jun. 18, 2013, and claims priority to Russian Patent Application Serial No. RU 2013123536, filed May 22, 2013, Russian Patent Application Serial No. RU 2012136757, filed Aug. 27, 2012, and Russian Patent Application Serial No. RU 2012125534, filed Jun. 19, 2012, the entire specifications of all of which are expressly incorporated herein by reference.

This group of inventions relates to organic chemistry and can be used for purification of water, industrial and household sewage or sewage sludge, for containment and skimming off oil or oil products in large water reservoirs, rivers, lakes and seas.

There is a wide range of substances that can be used for the removal of oil and oil products from water. These substances can contain organic or inorganic components. Most of them are solid powder materials with a large specific surface, which can adsorb or absorb oil and oil products. There are also materials that can cause coagulation of droplets of oil and oil products. These materials are used for the separation of oil and oil products from water in oil/water mixtures. The following methods can be cited:

- filtration of a mixture of the two immiscible liquids, producing two separate phases. This method is characterised by high efficiency. However it requires complicated equipment;
- introducing sorbents directly into a mixture of the two immiscible liquids. In this case oil and oil products are adsorbed on the surface of these sorbents, which permits removing them easily from the surface or from the body of water. The effectiveness of these methods of separation depends on the specific surface area of the sorbent and on its affinity for oil and oil products;
- introducing a coagulation agent, which causes merging of small droplets of oil or oil products into larger aggregates. This divides the mixture into two layers, which simplifies their mechanical separation in precipitation tanks. This method is suitable for the separation of water/oil mixtures in closed systems: purification plants, collectors or closed industrial cycles.

There exists in the existing art a sorbent for gathering oil on the surface of water, of the following composition (mass %): powdered carbon, 2.6-3; oil-wetting agent, 3-3.4; polyamide fibers 14-24; rubber crumbs, remainder [Patent RU No. 2479348, IPC B01J20/20, 2011].

The main problem with this and similar sorbents is that they cannot be used again and that the products they form are difficult to utilize. A second re-sorption is considerably less efficient than the first one, even in the case of fibrous materials, which can be wringed partly out and used again.

There is a composition that contains latex of natural rubber or of butadien styrol rubber deposited on vermiculite or oxidized graphite, produced by frothing the original component immediately prior to covering it with a polymer (Patent RU No. 2471041, IPC E02B15/04, 2011).

The problem with this compound is the high consumption rate of the sorbent with respect to the amount of gathered oil and also its rather complicated production and utilization processes.

The material nearest to the claimed material, both in composition and its technological results, is the material, representing a polymer-colloidal complex, produced by mixing a chitosan solution, diluted with acetic acid, with a 5-10% aqueous solution of gelatin at 1: (1.8-2.2) mass ratio (Patent RU No. 2352388, IPC B01J20/26, 2007).

This method has the following drawbacks: an uncontrolled jellification process during the mixing of the two components, which results in the formation of lumps of inhomogeneous composition, and high concentration of the reactants required to produce a polymer-colloid complex.

There is a method of separating water/oil mixtures by filtering the emulsion through a sorbing material containing layers of materials with hydrophobic or hydrophilic surfaces and also a surface made of ultra-fine hydrophilic fibers, dielectric permeability of which exceeds—by at least 1.45 units—permeability of the layer of polymer fibers with a hydrophobic surface. Filtering is carried out through the hydrophobic surface of lower dielectric permeability, then through the hydrophobic layer of a lower dielectric permeability first, then through the hydrophilic layer of a greater dielectric permeability, forming a double electric layer at the interface of the above-mentioned two layers; this double electric layer neutralizes the double electric layer on the surface of emulgated particles. This method has been used in an installation for separation of water/oil mixtures and a filtering material for their separation. This system represents a three-layer filtering membrane, designed in such a fashion as to ensure that the oil phase is removed efficiently from its surface (Patent RU No. 2361661, IPC B01J20/26, B01D17/022, 2009).

The main drawback of this system is its complicated design as well as having to recondition its every component regularly due to the blocking of pores of the first two layers. On the other hand, using only a hydrophilic membrane is not an option because the surface of hydrophilic fibres easily becomes contaminated with components of the oil separated: high molecular mass hydrocarbons for example, which are present in crude oil and oil products. Separation efficiency drops drastically because of that. Another problem is in the oil drops start being pushed through filter pores when pressure or the thickness of the layer above the filter increases. This effect causes a secondary mixing of the separated fluids.

There is a method that includes containing oil spills within the underwater trench passage of an oil pipeline, using a water-permeable oil-impermeable fabric to cover the trench. A perforated pipe, filled with non-woven, sorbent material, is placed under the fabric. The sorbing material is fixed to a cord, with which the sorbent material can be withdrawn from inside the pipe, reconditioned by wringing or replaced, then returned for multiple use. This method prevents oil contaminating water because this device for containing and gathering oil starts operating as soon as the oil pipeline has been perforated and there is a leakage of oil (Patent RU No. 2439244 C1, IPC E20B15/04, 10.01.2012).

This method has the following drawbacks: having to assemble bulky components (domes, nettings) under water, a considerable time required for the elimination of the consequences of accidents, having to use extra equipment for gathering oil and oil products, and having to separate oil and oil products from the sorbing material. All these processes require considerable capital investments. For this reason, this method can be used for gathering oil or oil products in deep areas only when major pipelines are concerned. Moreover, a large portion of oil or oil products becomes lost, while the contaminated sorbing material needs to be utilised.

There is a method of coagulation of suspended oil particles, described in a patent for a compound containing a mixture of carboxymethylated yeasts, high fatty acid, and water-soluble salt of a polyvalent metal (Patent U.S. Pat. No. 4,178,265, IPC C02F 1/52, 1978).

This material has the following disadvantage: carboxymethylated yeast cannot trigger off oil coagulation unaided. Consequently, they need to be precipitated with salts of polyvalent metals, which then are hard to utilise.

A common downside of all the above-listed methods and materials lies in the respect that they cannot be recovered or reconditioned and return a vendible product, and also problems with utilising slime. After a sorbent (coagulant) has been used, the captured oil and oil products cannot be separated and recovered for a second use, which makes utilisation of slimes a serious problem, as they require either burning or storage in specially allocated areas.

The present group of inventions aims at ensuring that a vendible product captured during the treatment of oil and oil products, could be recovered and used again and that utilising the slime would become easier.

This aim is achieved by using aqueous solutions of polysaccharide microgels with a molecular mass of 20,000-200,000 Da and a particle size of 50-600 nm. Low concentrations (0.1-20 g/l) of aqueous solutions of polysaccharide microgels are used, ensuring that the original polysaccharides are used economically.

Microgels represent branched colloidal polymer particles of 0.01-1μ, which swell significantly in a solvent due to electrostatic or steric repulsion between electrically charged groups. They are produced either by directed polymerisation of monomers or by pH-initiated neutralisation of solutions of synthetic or natural polymers carrying carboxylic or amino groups The microgels used in this invention include colloidal solutions of natural polysaccharides: low-substituted (<40%) carboxymethylcellulose and its salts formed with aliphatic amines (butylamine, benzylamine, ethylenediamine, hexamethylenediamine); chitosan, deacetylated by 90-97%, pectin-based substances with residual methoxy groups <25%. Molecular mass of the products can vary from 20,000 to 200,000 Da. Neither high-molecular-mass (>200,000 Da) nor low-molecular-mass (<20,000 Da) polysaccharide derivatives are suitable for this technology. Chemical cross-linking of polysaccharide polymer chains, using anhydrides and activated ethers of dicarboxylic acid, diisocyanides, diisocyanates and other cross-linking agents can be used to produce microgels that would be more stable for long periods of time. Size of chemically cross-linked particles of polysaccharide microgel vary—preferably—within the 50-600 nm range. The polysaccharide microgels, used in this invention can be produced by either physical association or chemical cross-linking.

The material based on polysaccharide microgels, claimed in this invention, can be used as a surface modifier of a filter for separation of water/oil mixtures by filtering.

The claimed method includes filtration of oil/water mixtures through hydrophilic material, different in the respect that it includes an a-priori treatment of the filtering material with a water solution of polysaccharide microgels with a molecular mass of 20,000-200,000 Da and a particle size of 50-600 nm. Concentration of microgels in the solution varies within the 0.5-20 g/l range. Concentrations below or above these values were not used in this invention. At higher than 20 g/l concentrations microgel particles block pores of the filter material, hindering filtration. On the other hand, using low-concentration solutions is ineffective because the microgel on the filter material will not have sufficient absorption.

The filtering material is subjected to the following treatment: it is submerged in an aqueous solution of polysaccharide microgels for 20 minutes.

To prevent droplets of oil being forced through the filtering material, the water/oil mixture flows onto the filter material continuously so that the layer of fluid above the surface of the filter is maintained at 10-20 cm and specific pressure of the mixture on the fabric does not exceed 2,000 Pa.

The filter materials used in this invention were closely-woven cotton or flax fabrics, non-woven cotton or flax materials, closely-woven Capron or nylon meshes. The main requirement to the filter material is the size and distribution of pores because these ensure an even flow of water through the filter. Defects (pores with more than 500μ in diameter) in the filtering material result in secondary mixing of the separated fluids.

The claimed material, based on polysaccharide microgels can be used as a sorbent in containment of underwater spills of oil and oil products, followed by their gathering and removal from water surface.

The claimed method related to containment of spills of oil and oil products includes delivery of an aqueous solution of polysaccharide microgels, 20,000-200,000 Da molecular mass and 50-600 nm a particle size, to the area of spill under the water. Concentration of polysaccharide microgels in the area of oil/oil products spill is maintained at values no lower than 0.1 g/l.

Polysaccharides of low molecular mass (<20,000 Da) are not suitable for this method because their solubility in water is too high. On the other hand, viscosity of polysaccharide of high molecular mass (>200,000 Da) is too high, which makes producing microgels on their basis too difficult.

The claimed method can be used in one of two versions: prevention of oil/oil product spills and during their transportation through pipelines, or for containment of oil/oil product spills in hard-to-access areas (under the ice or man-made structures).

In the case of transportation of oil and oil products through pipes, an aqueous solution of polysaccharide microgels is admitted via a permanently-installed flexible or rigid line, fastened to the outer surface of the pipeline, with nozzles distributed along the line every ten (for example) meters. The aqueous solution of polysaccharide microgels is pumped into the line from the tanks also distributed along the pipeline. When an accidental underwater spill of oil or oil products occurs, the concentration of these products in the zone adjacent to the accident increases. When an accidental spill has been established with automatic sensors mounted on the surface of the pipeline, by visual inspection or using some other means, the nearest to the accident nozzle will be activated at the control panel. Concentrated aqueous solution of a polysaccharide microgel will start flowing into the contaminated area, and when the required concentration (0.1 g/l) is reached, encapsulation of oil or oil products begins.

When fighting oil/oil product spills in areas of difficult access (under the ice or man-made structures), the system used for their containment will include a tank, a pump, a flexible or rigid line for admitting the solution, and a nozzle. When a spill is detected, the flexible or rigid line is lowered into the spill zone, then the pump is switched on, and a concentrated aqueous solution of a polysaccharide microgel flows to the accident through the nozzle.

Encapsulation rate is the same in sea or fresh water. For this reason, this method can used for containment of spills of oil or oil products in the sea or in bodies of fresh water (lakes, rivers or bogs). Oil or oil products gathered in the form of capsules do not spread when emerging on the surface of water, do not harm the environment, and do not catch fire or evaporate. They are easily collected with fine-mesh netting (1-2 mm), while the collected oil or oil products can be returned back after their aggregates have been treated with alkali. The polysaccharide microgel can be used again. Consequently, this method does not produce any waste that needs to be utilised or burned.

The material claimed in this application is based on polysaccharide microgels and can be used as a coagulant for the removal of suspended oil or oil product particles in closed systems: water treatment facilitates, gathering tanks, closed industrial cycles.

This application claims a method of coagulation of suspended particles of oil and oil products, which includes delivering a water solution of polysaccharide microgels, 20,000-2000,000 Da molecular mass and 50-600 nm particle size into water contaminated with oil or oil products. Concentration of the microgel in the solution must not be lower than 0.1 g/l. After this treatment, droplets of oil or petroleum product droplets becomes coated with a thin polysaccharide film.

Changing pH of the solution causes formation of agglomerates, consisting of encapsulated droplets of oil or oil products and particles of coagulated microgel. These agglomerates sink to the bottom due to gravity. They can be easily removed, by mechanical means.

pH of the solution can be changed either spontaneously, by diluting the original, concentrated solution or deliberately, by introducing acids (when carboxymethylcellulose or pectin are used) or alkali (when chitosan is used). The claimed method is based on the property of polysaccharide microgels to coagulate in diluted aqueous solutions. Colloidal particles of the microgel, with their large specific surface, precipitate on interphase surfaces, interact with droplets of oil or with inorganic particles, and adsorb small molecules and ions of metals. They lose their colloidal stability because of this and interact with one another, forming agglomerates, and—gradually—precipitate. Depending on the substitution and polymerisation levels of the original polysaccharide, it is possible to vary precipitation rate of samples. Characteristic features of the materials claimed in this application is their being biodegradable and capable of being recovered and of returning the vendible product, as well as their high activity with respect to ions of metals. This is especially important for the removal of oil and oil products and the removal of heavy metals from waste water.

Coagulation of suspended oil and oil product particles can be carried out with one of two methods: either in a flow of fluid or in closed tanks. When the former method is used, the microgel solution is introduced into a pipe with a flow of contaminated water in it in such a fashion that the final concentration of the microgel would be no lower than 0.1 g/l. Coagulation of suspended particles of oil and oil products occupies 1-2 sec, and this ensures that oil and oil products are removed continuously from the flow. Hydrocyclones are most often used to remove the agglomerates consisting of encapsulated droplets of oil or oil products. Fabric and mesh filters and centrifuges are also used. When the second method is used, coagulation is carried out in closed tanks, slightly stirring the mixture for 2-10 hours. Slow coagulation promotes formation of denser agglomerates, which sink to the bottom due to gravity and are removed via the bottom outlet. These two methods complement each other and can be used to organize recirculation water cycles in mechanical engineering plants and in oil exploration and refining.

The material claimed in this application possesses several essential new properties, which the prototype of this invention lacks: it contains polysaccharide microgels in the form of aqueous solutions.

The claimed method for the separation of water/oil mixtures is characterised by several essential new characteristics as compared to the prototype: a single layer of filtering material is used; the filter is treated with an aqueous solution of polysaccharide microgels; a new separation principle is used, based on the formation of elastic polymer film on the surface of droplets of oil.

The claimed method of the containment of oil or oil product spills is characterised by several essential new features as compared to the prototype: using a new containment techniques, based on prevention of oil or oil products spreading on the water surface or in the body of water, including under the ice by the means of introducing [an unfinished sentence in the original document]

The claimed coagulation method is characterised by several essential new features: a special mechanism of coagulation is used, based on surface-active properties of colloidal particles: microgels.

Polysaccharides and their microgels with a particle size of 50-600 nm are widely used in various scientific and technical applications. However, these polymers have poor surface-active properties, and until now, they had a limited use as colloid stabilisers of emulsions. The present group of inventions uses for the first time the capability of polysaccharides to become adsorbed on an interphase surface in the form of microgels.

With respect to the claimed material, the presence of polysaccharide microgels solves the following problems: improves ecological cleanliness of the process of removal of oil and oil products from water, ensures that oil and oil products can be returned after they have been removed from water, and provides the option of recovering and re-using the material itself.

With respect to the claimed method of the separation of water/oil or oil products mixtures, the use of polysaccharide microgels solves the following problems: protects the surface of fibers from contamination with oil and stabilises oil droplets by forming an elastic film on their surface. Consequently, introducing a microgel solution into the water/oil mixture causes adsorption of microgel particles by the surface of fibers and the filling of the pores in the material with the solution, and also an interaction between the microgel and oil droplets at the time when the mixture of the two fluids is approaches the filter. The microgel film on the surface of oil droplets stabilises the fluid layer adjacent to the filter and prevents oil droplets sliding trough its pores. This principle of separating mixtures of two immiscible fluids has never been used before.

With respect to the claimed oil/oil products spill containment method, the use of polysaccharide microgels solves the following problems: isolates droplets of oil and oil products from water by forming an elastic film on their surface, and prevents the spread of oil/oil products on the surface of water when the spill floats up, or under the ice or man-made structures. Using this method, oil and oil products, normally fluids characterised by considerable fluidity, become an elastic gel of much lower mobility. Encapsulated oil or oil products, not being capable of spreading over a large area, become contained around the spill area, which simplifies their skimming off and reduces the harm to the environment. This method of containing underwater spills of oil and oil product is new, and it achieves the results claimed in this application.

With respect to the claimed coagulation method, the use of polysaccharide microgels solves the problem of utilisation and treatment of the slimes left after oil and oil products have been removed. Moreover, this method does not pollute the environment with heavy metals contained in inorganic coagulation agents.

The claimed group of inventions can be used successfully for the elimination of spills of crude oil and oil products, in treatment of oil-slimes, cleaning industrial waste water and household sewage from oil products, droplets of oil, inorganic particles, small molecules and ions of metals, facilitating return of the vendible product. This group of inventions can be implemented in real life, with the use of known materials and substances. The claimed sorbent and the methods of its use have been tested in testing units of up to 200 l capacity. The tests have proven that this sorbent and the methods of its application are highly effective.

The claimed material and the methods of its application are part of a single innovative idea: using water solutions of polysaccharide microgels with a molecular mass of 20,000-200,00 Da, a particle size of 50-600 nm, a concentration of 0.1-20 g/l as a surface modifier, a sorbent and a coagulation agent for cleaning water from oil and oil products. This produces a single technological result: the opportunity to return the vendible product, captured during the purification process, as well as to re-use the polysaccharide microgel solution itself. Moreover, the use of polysaccharide microgel solutions simplifies utilisation of the slime. This suggests the conclusion: the versions claimed in this application fit 'the unity of invention' criterion.

EXAMPLES OF THE PRODUCTION OF POLYSACCHARIDE MICROGELS

Example 1

Chitosan (1 g), deacetylated by 95%, with a molecular mass of 200,000 Da, was dissolved in 1 l of 0.01 M hydrochloric acid. 0.05 M sodium hydroxide solution was added to that solution up to pH=6.8. The produced chitosan microgel with a particle size of 150-200 nm and a concentration of 1 g/l was used directly to contain underwater oil spills.

Example 2

Microcrystalline cellulose, produced by acid hydrolysis (duration: 15 minutes) in the presence of hydrochloric acid (25% concentration) at a hydromodulus of 20 and a temperature of 75-85° C., had a molecular mass of 42,000 Da. The cellulose was dissolved at 5% concentration in a system, consisting of 8% sodium hydroxide, 5% urea and 87% water at −5-0° C. The insoluble precipitate was 0%. Chloroacetic acid (25% concentration) was added to this, at a chloroacetic acid/cellulose elementary chain unit mole ratio of 1.5:1. The solution was held at 25° C. for 24 hours. The final cellulose alkylation level was 25%. The particle size of the microgel was 250-300 nm. The solution was diluted with either distilled or tap water to a concentration of 0.1 g/l and used for coagulation of suspended oil particles. The solution had pH=10.

Example 3

Pectin (5 g), methoxylated by 15%, with a molecular mass of 20,000 Da was dissolved in 1 l sodium hydroxide solution (2 g/l). That solution was titrated with 0.2% HCl till the solution became turbid (pH=6.0-6.5) This chitosan microgel suspension (particle size 200-250 nm, 5 g/l concentration) was used for containment of underwater oil spills.

Example 4

Chitosan (5 g), at a 95% deacetylation level and a molecular mass of 110,000 Da, was dissolved in 1 l of 0.1 M hydrochloric acid. To that solution 0.5 M sodium hydroxide solution was added up to pH=6.5-6.8. Then a solution consisting of 3 g of glutaric anhydride dissolved in acetone nitrile (25 ml) was added by the drop. The microgel particle size was 120-160 nm. The mixture was stirred for 1 h, then that solution, at a concentration of 5 g/l, was used for treating woven materials to use for separation of water/oil mixtures.

Example 5

2.5 g of chitosan at a 90% deacetylation and with a molecular mass of 150,000 Da, was dissolved in 1 l of a 0.2% aqueous solution of sodium hydroxide. This solution was titrated with a 0.2% aqueous solution of sodium hydroxide till the solution became turbid (pH=6.0-6.5). A calculated quantity of a mixture consisting of hydroxysuccinimide, dicyclohexylcarbodiimide and palmitic acid in 200 ml of dichlormethane was added to that solution. The mixture was stirred vigorously until a uniform emulsion resulted. The microgel particle size was 140-180 nm. Then pH of the mixture was brought up to 8.5, by the introduction of an organic base, triethylamine, and kept for 1 h. Then the chlormethane was extracted at heating and intensive mixing. The formed dicyclohexylurea deposit was removed by filtering, and the water phase with a concentration of 2 g/l was used for containment of underwater oil spills. Diluted 10-folds, to a concentration of 0.2 g/l, that material was used for coagulation of suspended in water oil particles.

Example 6

2.5 g of chitosan, deacetylated by 98%, molecular mass 80,000 Da, was dissolved in 1 l of 0.2% aqueous solution of hydrochloric acid. This solution was titred with 0.2% sodium hydroxide solution till the solution became turbid (pH=6.0-6.5). A calculated quantity of a mixture of cyclohexyl isocyanide, formaldehyde and palmitic acid in 200 ml of chloroform was added to the original solution. The mixture was vigorously stirred until a uniform emulsion formed. pH of this mixture was brought to 8.5 by adding triethylamine and kept for 1 h. The microgel particle size was 50-70 nm. Chloroform was extracted at heating and intensive stirring. The water phase was filtered, and its concentration was brought to 20 g/l. The resultant solution was deposited on woven materials used for separating water/oil mixtures.

Example 7

A sodium salt of carboxylmethylcellulose (25 g) with up to 40% substitution with respect to carboxymetile groups about and a molecular mass from 55,000 Da up, was dissolved in 1 l of water. First 2.5 g of hexamethylendiamine, then a concentrated solution of hydrochloric acid were introduced into the original solution until an acid pH=1-3 reaction occurred. The resulting solution of carboxymethylcellulose, 500-600 nm particle size and 20 g/l concentration, was deposited on woven materials used for separating water/oil mixtures.

Example 8

Pectin (5 g), methoxylated by 6%, with a molecular mass of 65,000 Da, was dissolved in 1 l of sodium hydroxide solution (2 g/l). Added to this solution were: 2 g of benzylamine hydrochloride and 200 mg diisocyan propyl piperazine. When these two agents were fully dissolved, 3 ml of formalin were introduced, and the solution was held for 2 h, stirred vigorously all the time. This solution, with a particle size of 300-400 nm and at a concentration of 5 g/l was used containing underwater oil spills. Diluted 50-folds down to a concentration of 0.1 g/l, this solution can be used for coagulation of particles of oil products suspended in water.

Examples of the Application of this Method for Separation of Water/Oil Mixtures, Using Polysaccharide Microgels Example 9

A sample of cotton flannel was soaked for 30 minutes in a solution of the microgel, produced as described for Example 4. The cotton flannel, impregnated with the microgel solution was placed on a large-hole metal mesh. A mixture of crude oil (1 l) and water (9 l) was admitted continuously in a gravity flow to the filter, impregnated with the microgel solution in such a fashion that the thickness of the layer of fluid above the filter stayed in the 10-20 cm range. The separated from water oil was drained into a separate tank.

Example 10

The microgel solution, the same as in Example 7, was deposited on a filtering material. The unwoven cotton material was soaked in the microgel solution for 30 minutes, then placed on a ceramic filter with holes of 1 mm diameter. A mixture of toluene (2 l) and water (8 l) was admitted in a continuous gravity flow to the filter impregnated with the microgel solution in such a fashion that the layer of fluid above the filter was maintained at 10-20 cm. The toluene was, after separation, drained into a separate tank.

Example 11

The microgel solution prepared as in 6, was used for depositing it on a linen fabric. The fabric, after being soaked in a microgel solution for 30 minutes, was stretched around a metal cylinder. A mixture of benzene (2 l) and water (8 l) was admitted in a continuous gravity flow to the filter impregnated with the microgel solution in such a fashion that the layer of fluid above the filter was maintained in the 10-20 cm range. The separated benzene was poured into a special tank.

Examples for the Application of the Containment Method of Oil Spills in Water, Using Polysaccharide Microgels This method was tested in a laboratory installation, consisting of a plastic tube of 1 cm diameter, extending through the lower part of a 10 l capacity tank, filled with water. The tube had artificial defects imitating discontinuities in a pipeline. Tests were carried out by pumping crude oil through the tube under pressure, so that some of the oil went through the defects into the water. Using a flexible line in the form of a reinforced rubber tube of 1 cm diameter, polysaccharide microgel aqueous solution was supplied directly to the spill area until its concentration in the water reached an assigned level, which was checked by probes taken with a liquid sampler. The floating on the surface agglomerates of encapsulated oil were skimmed off with a fine-mesh net and analysed.

Example 12

A suspension of the microgel, produced as described in Example 1, was admitted in a continuous flow into the laboratory installation, in the direction towards the floating up oil droplets. When its concentration reached 0.1 g/l, the droplets became covered with a gel film. When individual droplets reached the surface, they gathered into lumps, which were skimmed off with a fine-mesh net. The total amount of suspension used per 1 l of crude oil amounted to 120 ml (600 mg recalculated for dry weight).

Example 13

A microgel solution, produced as in Example 5, at a concentration of 2 g/l, was admitted in a continuous flow into the laboratory installation, in the direction towards the floating up oil droplets. When its concentration reached 0.1 g/l, the droplets became covered with a gel film. When individual droplets reached the surface, they gathered into dense lumps, 3-4 cm diameter, which were skimmed off with a fine-mesh net. The total amount of suspension used per 1 l of crude oil amounted to 80 ml (2.4 g recalculated for dry weight).

Example 14

A suspension of the microgel produced as described in Example 3, was admitted in a continuous flow into the laboratory installation, in the direction towards the floating up oil droplets. When its concentration reached 0.1 g/l, the droplets became covered with a gel film. When individual droplets reached the surface, they gathered into lumps, which were skimmed off with a fine-mesh net. To obtain lumps of a greater density, the surface of the encapsulated oil was treated with 1% solution of hydrochloric acid. The total amount of suspension used per 1 l of crude oil amounted to 100 ml (500 mg recalculated for dry weight).

Example 15

Recovery of a pectin-based chemically-bound microgel. The skimmed off encapsulated oil (Example 14) was placed in a separate laboratory glass, then a concentrated sodium hydroxide solution (30%) was introduced, to establish pH 8. The gel disintegrated, and the system fell into two separate layers: crude oil at the top and the polysaccharide microgel solution at the bottom. After that separation into two layers, the microgel solution was acidified with 10% hydrochloric acid, reducing its pH to 3, and centrifuged to obtain a suspension of a higher concentration (5 g/l); this suspension was then alkalized again with sodium hydroxide and re-used for the containment of an oil spill. The results produced by the use of this solution were similar to the results reported in Example 3, where the original pectin was used. The number of reclamation cycles was 4-5.

Examples for the Implementation of the Method of Coagulation of Suspended Particles of Oil and Oil Products, Using Polysaccharide Microgels Example 16

The original microgel concentrate, at a concentration of 50 g/l, produced as per Example 2, was diluted with distilled water down to a concentration of 2 g/l. This microgel solution was introduced into an oil emulsion in water. The microgel solution use rate was 50 ml per one liter of emulsion, which corresponds to a microgel concentration of 0.1 g/l. The quantity of oil in water prior to coagulation was 2,000 mg per liter. The quantity of oil in water after coagulation was 29 mg per liter.

Example 17

The microgel solution as per Example 5, its original concentration being 2 g/l, was introduced into an emulsion of oil in water. The diluted solution use rate was 100 ml per one liter of emulsion, which corresponds to a microgel concentration of 0.2 g/l. The quantity of the immediately precipitated sediment was 0%. The acidity of the solution was made pH=8-9 by adding 5% NaOH solution. The quantity of oil in water prior to coagulation was 2,000 mg per liter. The quantity of oil in water after coagulation was 18 mg per tire.

Example 18

The microgel solution as per Example 8, its original concentration being 5 g/l, was introduced into an oil emulsion in water. The diluted solution use rate was 20 ml per one liter of emulsion, which corresponds to a final microgel concentration in the solution of 0.1 g/l. The quantity of the immediately precipitated sediment was 0%. Acidity of the solution was made pH=3-4 by adding some 5% HCl solution. The quantity of oil in water prior to coagulation was 2,000 per liter. The quantity of oil in water after coagulation was 14 mg per liter.

Example 19

Microgel recovery. After coagulating 1 l of emulsion containing 2,000 mg of oil by introducing a carboxymethyl cellulose solution as per Example 16, the sediment was isolated by filtering through cotton fabric. The mass of the sediment was 20 g. The sediment was mixed with 0.5 ml of hexane. Then 80 ml of a solution consisting of 9% of sodium hydroxide and of 91% of water, was introduced. The mixture was thoroughly mixed and cooled down to −4° C. in the course of 1 hour. Then the mixture was heated up to ambient temperature and centrifuged. The separated oil was poured out.

Table 1 shows a compilation of the data from the Examples with polysaccharide microgels used.

TABLE 1

| No. | Basis | Molecular mass, thousand Da | Particle size, nm | Concentration, g/l | Application |
|---|---|---|---|---|---|
| 1. | Chitosan | 200 | 150-200 | 1 | Oil spill containment |
| 2. | Microcrystalline cellulose | 42 | 250-300 | 0.1 | Coagulation of suspended oil particles |
| 3. | Pectin | 20 | 200-250 | 5 | Oil spill containment |
| 4. | Chitosan | 110 | 120-160 | 5 | Treatment of filters |
| 5. | Chitosan | 150 | 140-180 | 0.2 | Coagulation of suspended oil particles |
|    |          |     |         | 2   | Oil spill containment |
| 6. | Chitosan | 80 | 50-70 | 20 | Treatment of filters |
| 7. | Sodium salt of carboxymethyl cellulose | 55 | 500-600 | 20 | Treatment of filters |
| 8. | Pectin | 65 | 300-400 | 0.1 | Coagulation of suspended oil particles |
|    |        |    |         | 5 | Oil spill containment |

The invention claimed is:

1. A substance for cleaning water from oil, oil products, or metal ions, comprising an aqueous solution of an organic polymer, wherein the organic polymer includes polysaccharide microgels having a molecular mass of 20,000-200,000 Da and a particle size of 50-600 nm, wherein a concentration of the polysaccharide microgels ranges from 0.1 to 20 g/l.

2. The substance according to claim 1, wherein the organic polymer includes a chitosan-based microgel with a molecular mass of 200,000 Da and a particle size of 150-200 nm.

3. The substance according to claim 1, wherein the organic polymer includes a pectin-based microgel with a molecular mass of 20,000 Da and a particle size of 200-250 nm.

4. The substance according to claim 1, wherein the organic polymer includes a microcrystalline cellulose-based microgel with a molecular mass of 42,000 Da and a particle size of 250-300 nm.

5. The substance according to claim 1, wherein the organic polymer includes a sodium salt of carboxymethyl cellulose with a molecular mass of 55,000 Da and a particle size of 500-600 nm.

6. A method of separation of water/oil mixtures by filtering the mixtures through a hydrophilic filtering material, wherein the hydrophilic filtering material is pre-treated with an aqueous solution of polysaccharide microgels with a molecular mass of 20,000-200,000 Da and a particle size of 50-600 nm, wherein a concentration of the polysaccharide microgels is 0.5-20 g/l.

7. The method according to claim 6, wherein the pre-treatment of the hydrophilic filtering material includes soaking in the aqueous solution for at least 20 minutes.

8. The method according to claim 6, wherein the filtration is carried out when a specific pressure of the mixtures onto the filtering material does not exceed 2,000 Pa.

9. A method for containment of spills of oil or oil products in aqueous environments by making the oil or oil products interact with a sorbent under water, then gathering the product of that interaction by mechanical methods, wherein the sorbent includes an aqueous solution of polysaccharide microgels with a molecular mass of 20,000-200,000 Da and a particle size of 50-600 nm, which is delivered to the spills, and maintaining a concentration of the polysaccharide microgels in the spills at 0.1-20 g/l.

10. The method according to claim 9, wherein a continuous delivery of the aqueous solution during transportation of the oil or oil products is carried out via a permanent line in the form of a tube and carrying nozzles mounted on an outer surface of a pipeline.

11. The method according to claim 9, wherein a tank with the aqueous solution is connected with a pump and a flexible or rigid tubing with a nozzle and is used to supply the aqueous solution to the spills.

12. A method for coagulation of suspended particles of oil, oil products, or metal ions by introducing a coagulation agent based on an organic polymer to water contaminated with the oil, oil products, or metal ions, wherein the coagulation agent includes an aqueous solution of polysaccharide microgels with a molecular mass of 20,000-200,000 Da and a particle size of 50-600 nm, wherein a concentration of the polysaccharide microgels is 0.1-20 g/l.

13. The method according to claim 12, wherein the coagulation is carried out in a flow of fluid, when the aqueous solution is introduced into a pipe in which the contaminated water is flowing.

14. The method according to claim 12, wherein the coagulation is carried out in closed tanks for 2-10 hours, constantly using gentle stirring.

* * * * *